(12) United States Patent
Prunty et al.

(10) Patent No.: US 7,047,525 B2
(45) Date of Patent: May 16, 2006

(54) SYSTEM AND METHOD FOR AN INTEROPERABILITY FRAMEWORK

(75) Inventors: Anna M. Prunty, Anthem, AZ (US); Dan H. Toraason, Peoria, AZ (US); Adesh H. Gokhale, Pune (IN); Neeraj Sharma, Haryana (IN); Harish Bharti, Phoenix, AZ (US); Linda Hiles, Wilton Manors, FL (US); Supratim Banerjee, Boca Raton, FL (US); Ana M. Muniz, Pembroke Pines, FL (US); Blake A. Benson, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 467 days.

(21) Appl. No.: 10/008,831

(22) Filed: Nov. 13, 2001

(65) Prior Publication Data

US 2004/0015891 A1 Jan. 22, 2004

Related U.S. Application Data

(60) Provisional application No. 60/280,806, filed on Apr. 2, 2001.

(51) Int. Cl.
*G06F 9/45* (2006.01)
(52) U.S. Cl. .................. 717/137; 717/103; 717/108; 717/116; 717/118; 709/201; 709/205; 709/231
(58) Field of Classification Search ............ 717/103, 717/108, 116, 171–172, 175–177, 111, 136–139, 717/106, 118, 168; 709/201, 203, 225, 227, 709/232, 205, 218, 231, 223, 246; 710/10; 713/152, 201, 203; 707/103 R
See application file for complete search history.

(56) References Cited

U.S. PATENT DOCUMENTS

| 5,493,508 A | | 2/1996 | Dangelo et al. .............. 716/5 |
| 5,499,343 A | * | 3/1996 | Pettus ...................... 709/203 |
| 5,608,903 A | | 3/1997 | Prasad et al. ................ 707/10 |
| 5,758,344 A | | 5/1998 | Prasad et al. ................ 707/10 |
| 5,768,515 A | * | 6/1998 | Choquier et al. .......... 709/206 |
| 5,832,275 A | | 11/1998 | Olds ........................ 717/173 |
| 5,854,927 A | | 12/1998 | Gelissen .................... 717/139 |
| 5,895,477 A | | 4/1999 | Orr et al. .................. 710/517 |

(Continued)

OTHER PUBLICATIONS

TITLE: Beyond RPC: The Virtual Network, author: Dalpee et al, Nov. 1993.*

(Continued)

*Primary Examiner*—Chameli C. Das
(74) *Attorney, Agent, or Firm*—Snell & Wilmer L.L.P.

(57) ABSTRACT

An embodiment of the present invention is a consolidated package for diverse platforms to interoperate and transfer data. It allows otherwise incompatible systems to communicate with each other, exchange information, and otherwise interact. An embodiment of the present invention translates requests for information into a predetermined format that can be transmitted from a first platform to a second platform. One embodiment may transfer the information in an XML format over the Internet using HTTP or HTTPS. The receiving computer translates the XML stream into a properly formatted request and finds the requested information. The requested information is translated into an XML stream and transmitted over the Internet using HTTPS. The information is then translated into a format that the requesting computer can use. The system and method described herein can be used to exchange data between two computing systems.

10 Claims, 8 Drawing Sheets

U.S. PATENT DOCUMENTS

| | | | |
|---|---|---|---|
| 5,911,070 A | 6/1999 | Solton et al. | 717/105 |
| 5,923,878 A | 7/1999 | Marsland | 717/139 |
| 6,028,998 A | 2/2000 | Gloudeman et al. | 717/108 |
| 6,052,527 A | 4/2000 | Delcourt et al. | 717/138 |
| 6,064,813 A | 5/2000 | Sitbon et al. | 717/100 |
| 6,134,539 A | 10/2000 | O'Connor et al. | 706/45 |
| 6,167,564 A | 12/2000 | Fontana et al. | 717/104 |
| 6,175,948 B1 | 1/2001 | Miller et al. | 716/7 |
| 6,182,080 B1 | 1/2001 | Clements | 707/102 |
| 6,192,411 B1 * | 2/2001 | Chan et al. | 709/232 |
| 6,219,803 B1 * | 4/2001 | Casella et al. | 714/38 |
| 6,256,779 B1 * | 7/2001 | Martin | 717/116 |
| 6,308,225 B1 * | 10/2001 | Schofield | 719/316 |
| 6,374,288 B1 * | 4/2002 | Bhagavath et al. | 709/203 |
| 6,438,540 B1 * | 8/2002 | Nasr et al. | 707/3 |
| 6,496,865 B1 * | 12/2002 | Sumsion et al. | 709/229 |
| 6,499,036 B1 * | 12/2002 | Gurevich | 707/103 R |
| 6,530,025 B1 * | 3/2003 | Nakagawa et al. | 713/201 |
| 6,578,068 B1 * | 6/2003 | Bowman-Amuah | 709/203 |
| 6,601,234 B1 * | 7/2003 | Bowman-Amuah | 717/108 |
| 6,606,660 B1 * | 8/2003 | Bowman-Amuah | 709/227 |
| 6,643,652 B1 * | 11/2003 | Helgeson et al. | 707/10 |
| 6,665,662 B1 * | 12/2003 | Kirkwood et al. | 707/3 |
| 6,718,516 B1 * | 4/2004 | Claussen et al. | 715/513 |
| 6,748,570 B1 * | 6/2004 | Bahrs et al. | 715/526 |
| 6,760,903 B1 * | 7/2004 | Morshed et al. | 717/130 |
| 6,772,408 B1 * | 8/2004 | Velonis et al. | 717/100 |
| 6,795,851 B1 * | 9/2004 | Noy | 709/218 |
| 6,804,818 B1 * | 10/2004 | Codella et al. | 719/315 |
| 6,868,447 B1 * | 3/2005 | Slaughter et al. | 709/225 |
| 6,886,170 B1 * | 4/2005 | Bahrs et al. | 719/318 |
| 6,915,513 B1 * | 7/2005 | Duesterwald et al. | 717/168 |
| 6,917,976 B1 * | 7/2005 | Slaughter et al. | 709/226 |
| 6,959,320 B1 * | 10/2005 | Shah et al. | 709/203 |
| 6,976,066 B1 * | 12/2005 | Mouhanna et al. | 709/223 |

OTHER PUBLICATIONS

TITLE: Experiences with network-based user agents for mobile applications, author: Porta et al, ACM, 1998.*

Daniel J. Barrett, Lori A. Clarke, Peri L. Tarr, and Alexander E. Wise, "A Framework for Event-Based Software Integration," ACM Transactions on Software Engineering and Methodology, vol. 5, No. 4, Oct. 1996, pp. 378-421.

Peter R. Sutton and Stephen W. Director, "Framework Encapsulations: A New Approach to CAD Tool Interoperability," pp. 134-139.

* cited by examiner

SYSTEM AND METHOD FOR AN INTEROPERABILITY FRAMEWORK

CROSS-REFERENCE TO RELATED APPLICATIONS

This application claims priority from U.S. Provisional Patent application Ser. No. 60/280,806, filed Apr. 2, 2001.

BACKGROUND OF THE INVENTION

1) Field of the Invention

This application generally discloses a method of accessing information and, more particularly, a computer-implemented method of accessing and exchanging information among otherwise incompatible platforms.

2) Background

Computer software has typically been operable on only the specific platform for which the software was created. For example, software developed for an Apple Macintosh computer is typically operable only on Apple Macintosh computers and would not be operable on a computer running LINUX. The same may also be true for the data stored by the various programs, as the data is generally not interchangeable among different platforms. Thus, if one wanted to share programs and data among various incompatible platforms, for example exchanging data regarding a particular item, the programs and data were first converted to be operable on the platforms.

In the past, data has been stored and maintained on various different platforms. For example, certain entities use systems based on Microsoft technology, such as Windows NT, Internet Information Services ("IIS"), or Component Object Model ("COM"). Other entities may use systems based on a UNIX platform, such as those developed by Sun Microsystems, using programs such as WebSphere Application Server ("WAS") and programming languages such as JAVA®. In certain situations, a single organization may use two different platforms (e.g., different divisions of a single organization may use different platforms). In other situations, an organization may wish to share data and programs with another organization, which uses a different platform.

With the recent proliferation of the use of the Internet and the corresponding growth in connectivity between computers, it has become more desirable to share data and programs among variously distributed locations. Of particular interest is the ability to access various pieces of information through an Internet interface, even when the data and programs containing the information were created for incompatible platforms. In the past, there have been tools used to convert programs such that they are operable on other platforms. However, such tools tended to be cumbersome, expensive, and wasteful in the use of computing resources. Therefore, there is a need for a tool that allows the use of various programs and data across various platforms.

BRIEF SUMMARY OF THE INVENTION

A method of the present invention includes two computing platforms coupled to an interoperability framework. The interoperability framework may be configured to translate information requests from one computing platform into a specific format that can then be translated into a format readable by the second computing platform. The second computing platform can then process the request and supply the requested information to the interoperability framework, which would then translate the information into a format readable by the first computing platform.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

Figure 1:
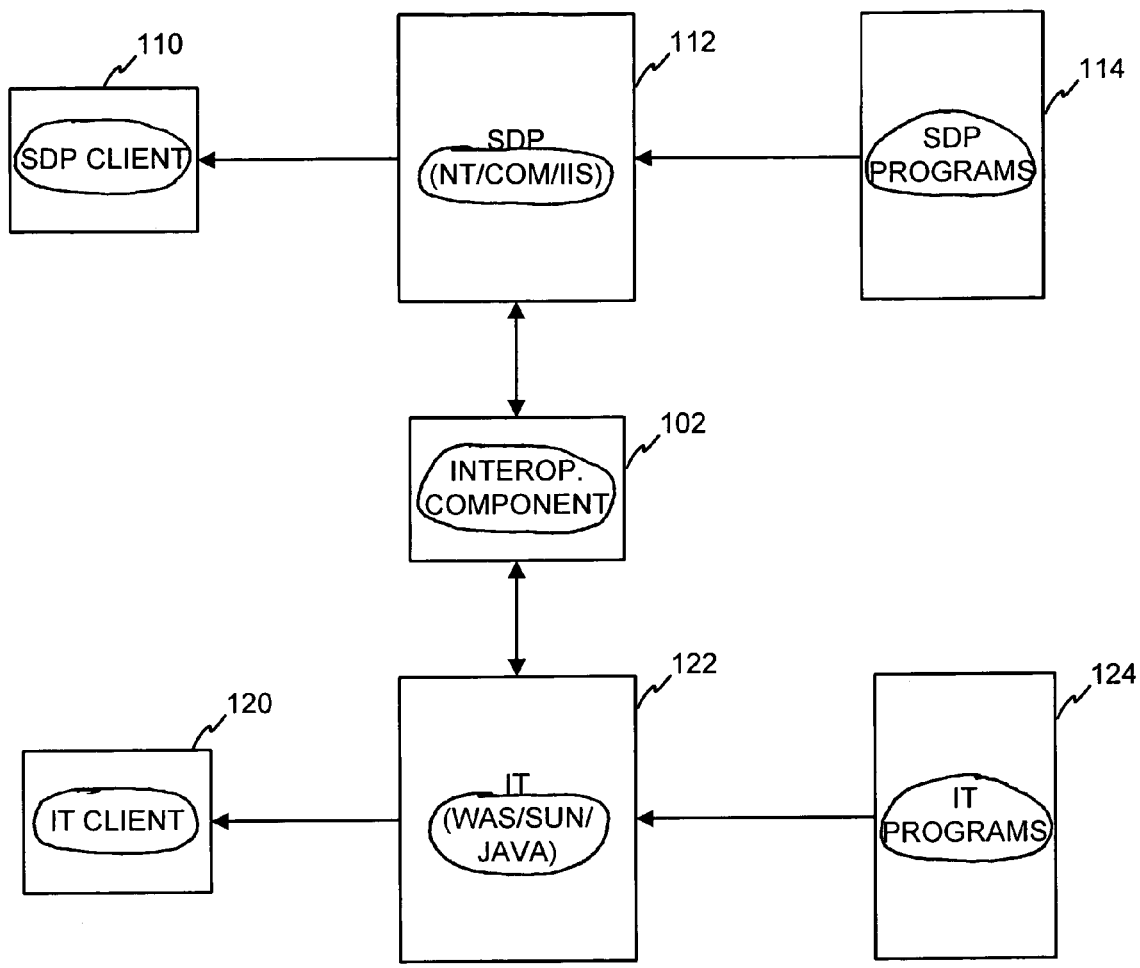
FIG. 1 is a block diagram illustrating an exemplary overview of the present invention.

The present invention may be described herein in terms of functional block components, screen shots, optional selections and various processing steps. It should be appreciated that such functional blocks may be realized by any number of hardware or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, VISUAL BASIC, or the like, with the various algorithms being implemented with any combination of data structures, objects, processes, routines or other programming elements. Further, it should be noted that the present invention may employ any number of conventional techniques for data transmission, signaling, data processing, network control, and the like.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships or physical couplings between the various elements. It should be noted that many alternative or additional functional relationships or physical connections may be present in a practical system.

It will be appreciated that many applications of the present invention could be formulated. One skilled in the art will appreciate that the network may include any system for exchanging data or transacting business, such as the Internet, an intranet, an extranet, WAN, LAN, satellite communications, or the like. The users may interact with the system via any input device such as a keyboard, mouse, kiosk, personal digital assistant, handheld computer (e.g., Palm Pilot®), cellular phone or the like. Similarly, the invention could be used in conjunction with any type of personal computer, network computer, workstation, minicomputer, mainframe, or the like running any operating system such as any version of Windows, Windows NT, Windows 2000, Windows Me., Windows 98, Windows 95, MacOS, OS/2, BeOS, Linux, UNIX, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

As will be appreciated by one of ordinary skill in the art, the present invention may be embodied as a method, a data processing system, a device for data processing, or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, or the like.

Communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, or the like.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of hardware and computer instructions.

The computing units may be connected with each other via a data communication network. The network may be a public network and assumed to be insecure and open to eavesdroppers. In the illustrated implementation, the network may be embodied as the Internet. In this context, the computers may or may not be connected to the Internet at all times. It is noted that the network may be implemented as other types of networks, such as an interactive television (ITV) network.

The present invention is directed to a transparent or substantially transparent method of accessing data and operating programs across various computing platforms. More particularly, the present invention allows programs written for various platforms to interact with each other. For purposes of illustration only, the configuration of particular embodiments will be shown to describe the invention. It should be understood, however, that the scope of the invention is not limited by such illustrations, as it is the claims at the end of this patent application that determine the scope of the invention.

In an exemplary embodiment, the system includes a bi-directional interoperability framework between diverse platforms, such as, for example, between WAS/SUN/Java™ and IIS/NT/COM applications. The system is a consolidated package for diverse platforms to interoperate and transfer data. The invention allows the development of components on, e.g., the WAS/SUN/JAVA™ platform, while at the same time, allowing applications on, e.g., the IIS/NT/COM platform to reuse the services/components built on WAS/SUN/JAVA™. Further, the cross-platform services, which typically included a separate effort on WAS/SUN/ JAVA™, as well as the IIS/NT/COM side, can now be offered through an interoperability channel, thus alleviating the need for two separate development efforts. Moreover, the invention can be delivered as an enterprise infrastructure solution within an organization, thereby allowing new applications to reuse the business functions/components already built on both WAS/SUN/ JAVA™ and IIS/NT/COM platforms.

An overview of an exemplary embodiment of the present invention is presented in FIG. 1. NT/COM/IIS system 112 communicates with client 110 and various programs 114. In a similar manner, WAS/SUN/JAVA™ system 122 communicates with client 120 and various programs 124. In a traditional system, system 112 is not able to communicate or share data with system 122. However, an embodiment of the present invention involves the use of an interoperability component 102 to allow the systems to communicate with each other and exchange information.

Figure 2:
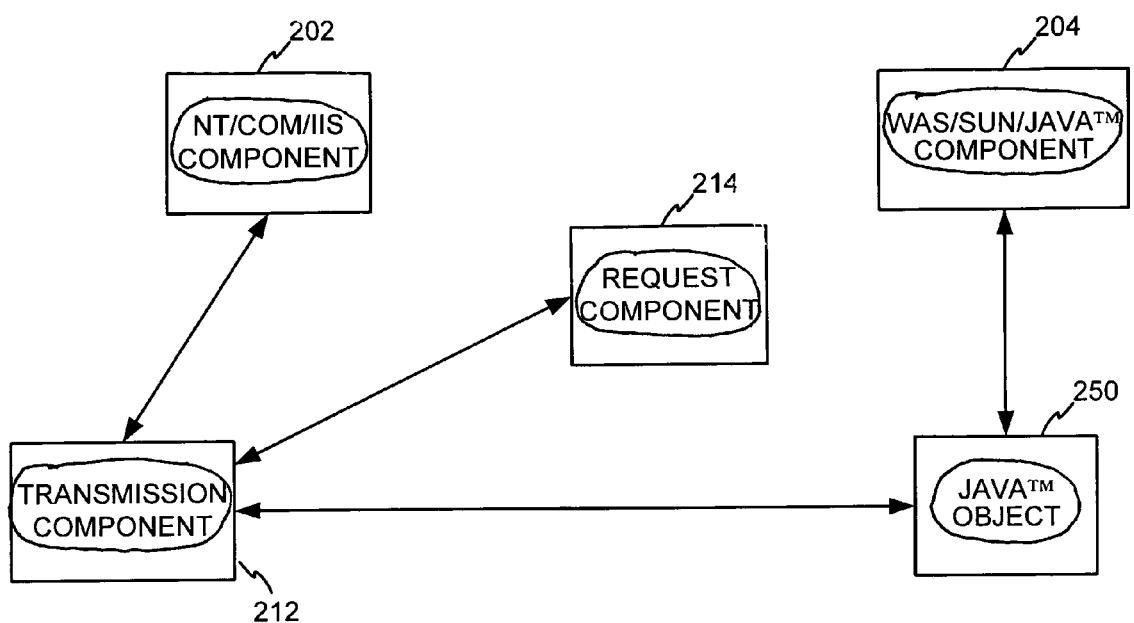
FIG. 2 is a block diagram illustrating a detailed view of an exemplary structure for the present invention.

FIG. 2 presents further details of the structure of an exemplary embodiment of the present invention. It may be desired to exchange information between an IIS/NT/COM component 202 and a WAS/SUN/JAVA™ component 204. COM component 202 may be configured to communicate a request to a transmission component 212. Transmission component 212 may be configured to transmit the request to a request component 214. Request component 214 can build and format a request stream and transmit the stream back to transmission component 212. Transmission component 212 is configured to be in communication with JAVA™ object 250 and to transmit the request stream. JAVA™ object 250 is configured to translate the request stream and obtain the requested data or perform the requested command via communication with WAS/SUN/JAVA™ component 204. The information can then be transmitted back to transmission component 212 through JAVA™ object 250, which may translate the response and transmit the response to COM component 202. In an exemplary embodiment, the information communicated between transmission component 212 and JAVA™ object 250 is through mutually agreed extensible Markup Language ("XML") messages, transmitted via HyperText Transfer Protodcol ("HTTP") or Secure Hyper-Text Transfer Protocol ("HTTPS"), using a version of Secure Sockets Layer ("SSL").

Figure 9:
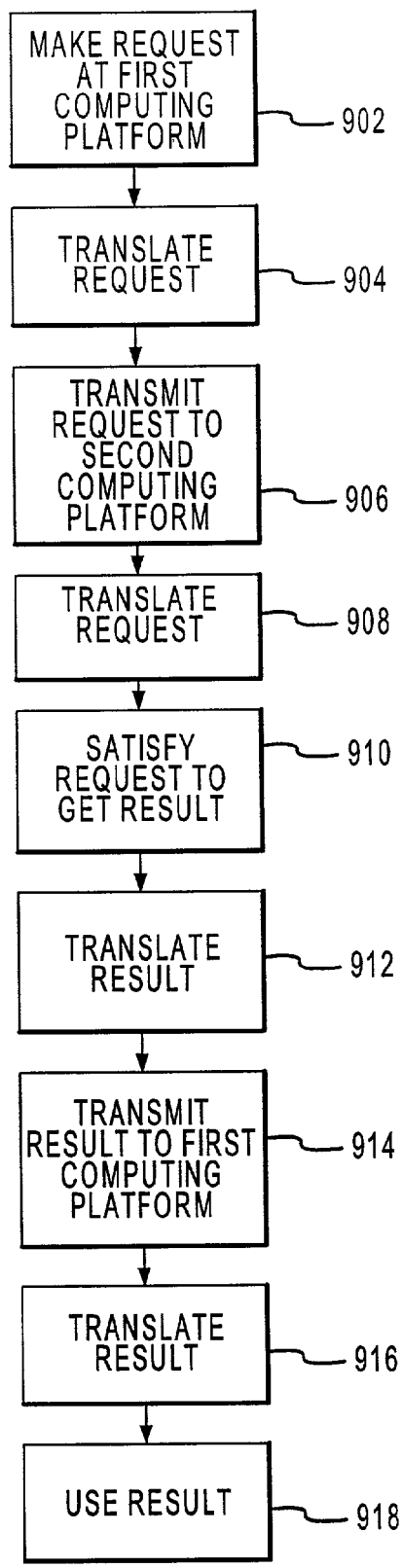

FIG. 9 presents a flowchart illustrating an exemplary overview of the operation of an embodiment of the present invention. A request is made at a first computing platform (step 902). The request is translated into a predetermined format that is readable by both the first computing platform and the second computing platform (e.g., XML) (step 904). The request is then transmitted from the first computing platform to the second computing platform (step 906). At the second computing platform, the request is translated from the predetermined format into a format usable by the second computing platform (step 908). The second computing platform then processes the request and either acquires the requested data or performs the requested task (step 910). The result is then translated into the predetermined format (step 912), and transmitted to the first computing platform (step 914). The first computing platform translates the result from the predetermined format (step 916) and displays the result or otherwise makes use of the result (step 918).

Figure 7:
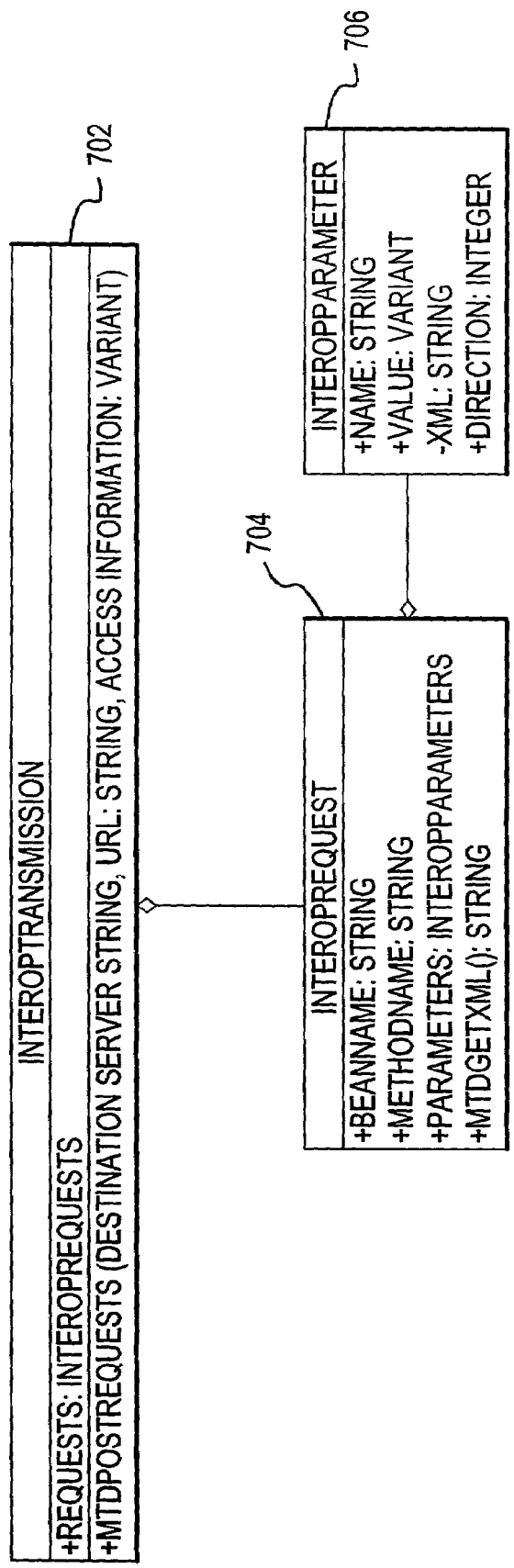
FIG. 7 is a block diagram illustrating exemplary classes that can be used in a visual basic embodiment.

An exemplary embodiment of the present invention may be written in Microsoft's Visual Basic language or other suitable language. For example, the Logical Class Diagram 700 of FIG. 7, illustrates various classes that can be used in a Visual Basic embodiment. The InteropTransmission class 702 may be configured to interact with an InteropRequest class 704 and an InteropParameter class 706. It should be noted that the InteropTransmission class 702 is responsible for the entire transmission (the posting of XML messages over HTTP or HTTPS) to an external system with which the communication is desired. InteropTransmission class 702 may be configured to send multiple InteropRequests in a single transmission. A request may specify a single request that may have multiple input/output parameters.

The InteropTransmission class is configured to transmit and receive data from an external system and is responsible for maintaining the information used to communicate with the external system. Such information may include the server name (i.e., where the Interoperability Component is located on the local server), the Uniform Resource Locator ("URL") of the external system's Interoperability Component, and any access information required by the external system, such as user identification and a password.

The InteropRequest class is configured to produce the XML required to build a request to be sent to the external system. It is also configured to convert obtain the reply and convert it into the format expected by the output parameters for the method and returning these in the output parameters of its parameters collection.

The InteropRequest class may contain the following variables: 1) BeanName, which contains the name of the bean owning the service requested; 2) MethodName, which contains the name of the method in the bean implementing the service; 3) Parameters, which contains an ordered collection of the parameters expected or returned by the method; and 4) XMLResponse, which contains the XML response result from the transmission of the request. The class may also contain a method called MtdGetXML, which produces the XML for the request. The method MtdGetXML may be configured to use its InteropParameters to build its XML request stream, returning it to its owner InteropTransmission object. This method may call the method InteropParameter::getXML, which obtains the XML representation of each parameter.

The InteropParameter class is responsible for maintaining the value, type, and direction of a single parameter. The InteropParameter class also transforms the parameter to and from XML format. The class may contain various variables. For example, as illustrated in FIG. 7, there may be variables containing the name of the parameter, the type of parameter, the value of the parameter, the direction (input or output) of the parameter, and the XML representation of the parameter. In a preferred embodiment, when the value of the XML string is set, the Value property of the property is updated from the contents of the XML stream. When this value is retrieved, the string is built from the current attributes of the parameter.

Various methods (code used to affect the object with which the method is associated) may also be present in a Visual Basic embodiment of the present invention. In the InteropTransmission class, there may be a method called mtdPostRequests which uses InteropRequests to build an XML request stream, send the stream via HTTPS, and wait for the response. The response can then be parsed to separate the responses for each request. The XMLResponse property of each InteropRequest is set accordingly.

An exemplary embodiment of the InteropTransmission class contains a variable called Requests that contains a collection of requests that are to be sent in a single transmission to the external system. It may also contain a method titled MtdPostRequests that posts the requests to the external system. A call to the method may be of the following format:

MtdPostRequests(DestinationServerName, URL, AccesInformation)

where DestinationServerName contains the address where the interoperability component resides; URL contains the URL specifying the external system's interoperability component; and AccessInformation may contain an array of information required to access the external system. For example, AccessInformation may contain a User Id and Password that is needed to access the external system. In the alternative, AccessInformation may contain an array of strings containing the access information needed to access the external system.

The MtdPostRequests method will use InteropRequests to build its XML request stream, send it via HTTPS, and wait for the response. In addition, other methods can be called from this method, including InteropRequest::mtdGetXML, which obtains the XML Request stream for each request; and InteropRequest::put_XMLResponse, which sets the XML Response stream for the request.

For purposes of illustration, an exemplary embodiment showing an interconnection between two entities, SDP and IT, will now be described. It should be understood that, for the illustrated embodiments, SDP is an exemplary entity that uses a NT/IIS/COM platform and IT is an exemplary entity that uses a WAS/SUN/JAVA platform.

Figure 3:
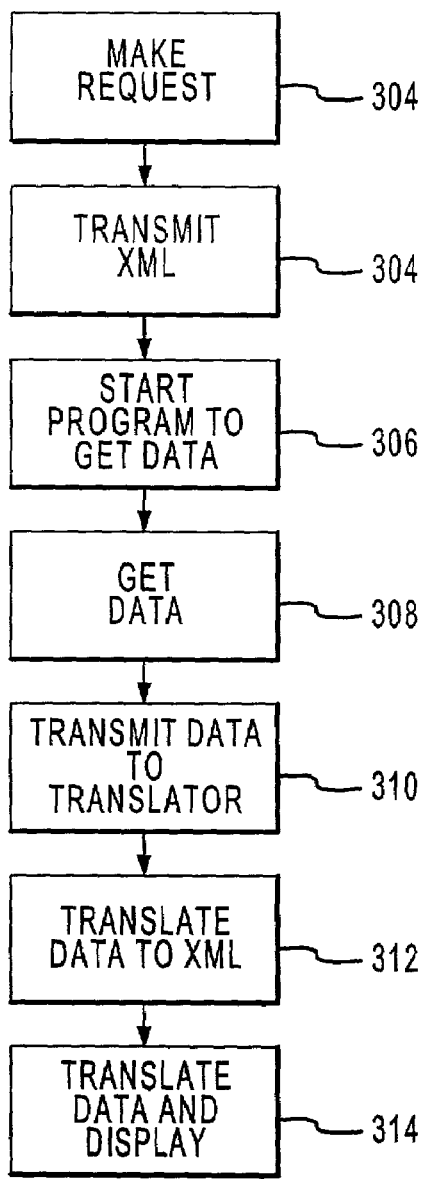
FIG. 3 is a flow chart illustrating exemplary steps for performing IT access to SDP services.

With reference to FIG. 3, the steps performed in an exemplary use of the system is as follows. FIG. 3, in particular, illustrates IT access to SDP services. A customer using an IT website makes a request that causes a JAVA™Server Page ("JSP") on the IT Web Server to be run (step 302). Because the request cannot be satisfied using JSP computing resources, the JSP on the IT Web Server determines that it must obtain the data requested by the client from the SDP system, so it invokes an Internet Server Application Programming Interface ("ISAPI") extension Dynamic Load Library ("DLL") on the SDP Web Server using the URL for the extension. The information required by the extension to run the requested method is translated into the XML stream that will identify the business request and is sent via HTTP (step 304). The extension then invokes a SDP Microsoft Transaction Server ("MTS") COM object to perform the necessary functions to fulfill the request (step 306). The SDP COM object performs the requested business work, which may involve gathering data from a back-end system, and presenting the data in the desired format (step 308). The SDP COM object returns the resulting data to the ISAPI extension (step 310). The ISAPI extension converts the data to XML and passes it to the IT Web Server via a HTTP response (step 312). The XML data is parsed on the IT side and sent to the JSP. The JSP obtains the data it requires to build its Hypertext Markup Language ("HTML") page. The JSP then serves the resulting HTML page to the client browser (step 314). It should be pointed out that, in an exemplary embodiment, steps 306–312, listed above, are performed by the external server, while steps 302, 304, and 314 are performed at the originating, IT server.

Figure 4:
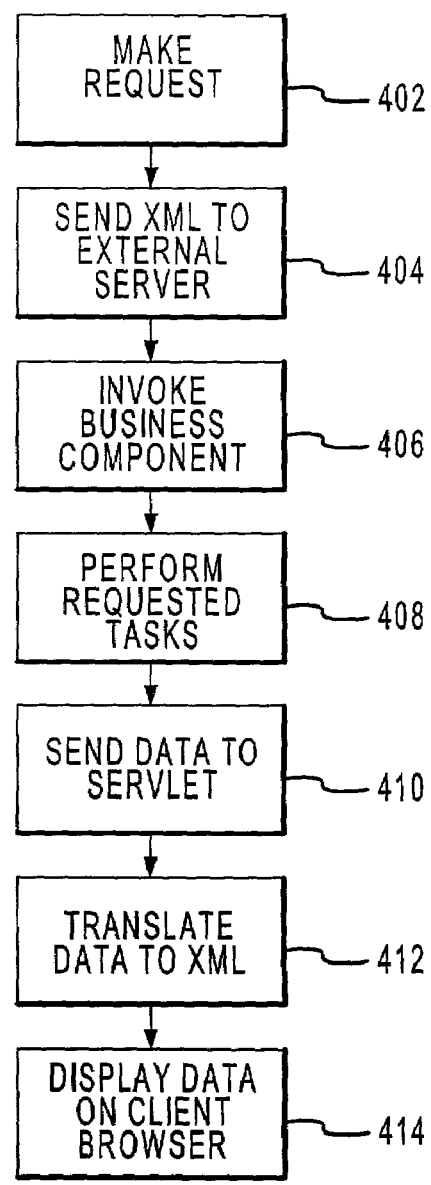
FIG. 4 is a flow chart illustrating an exemplary use of the system for SDP access to IT services.

With reference to FIG. 4, the steps of an exemplary use of the system for SDP access to IT services is as follows. A Customer Service Representative ("CSR") at the service center makes a request that causes an Active Server Page ("ASP") on the SDP Web Server to be run (step 402). The ASP on the SDP Web Server determines that it must obtain the data requested by the CSR from the IT System, so it invokes a servlet on the IT Web Server using the URL for the required servlet. The information required by the servlet to run the requested method is translated to an XML format and is sent via HTTPS (step 404). The servlet invokes the IT business component to perform the tasks to supply the requested information (step 406). The IT business component then performs the requested tasks (step 408), then returns the resulting data to the servlet (step 410). The servlet translates the data to XML and passes it to the SDP Web Server through HTTP or HTTPS (step 412). The data is then sent to the first server/platform (step 413). The ASP parses the XML data, converting the data to a readable format and obtaining the data it requires to build its page. The ASP then serves the resulting page to the client browser. It should be noted that steps 406–413 above are performed by the external server.

Figure 5:
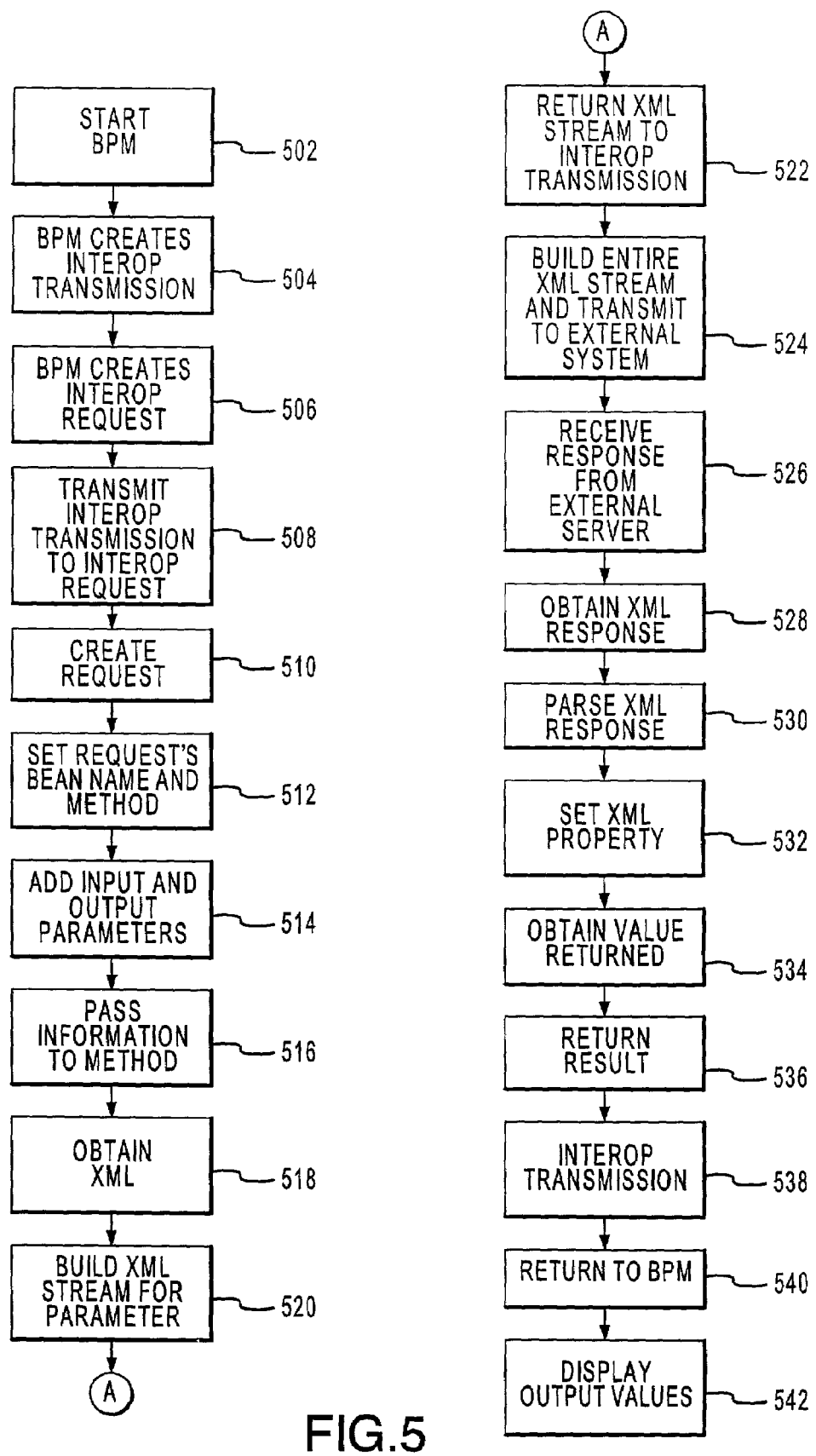
FIG. 5 is a flow chart illustrating an exemplary operation of an embodiment when SDP uses information available through an IT service.

The operation of a further embodiment of the present invention will now be presented. FIG. 5 illustrates the operation of an embodiment of the invention when SDP requires account information available through IT service. An ASP on SDP activates the Business Process Manager ("BPM") responsible for providing the account information (step 502). BPM creates an instance of an InteropTransmission class (step 504). The InteropTransmission class is created and creates an empty collection of InteropRequest (step 506). BPM transmits an InteropRequest to the InteropTransmission class (step 508). The InteropTransmission class creates the request, adds it to its collection, and returns a reference to the new request to the BPM (step 510). The BPM sets the Request's bean name and method (step 512). The BPM adds the input and output parameters to the request, via the AddParameter method, assigning the value property to all parameters that are in or in/out (step 514). The BPM calls the InteropTransmission::mtdPostRequests method, passing it the required information (step 516). The InteropTransmission class obtains the XML for each request via the InteropRequest::mtgGetXML method for each request to be sent in the transmission, using the XML strings to build the single XML stream to be sent in the transmission (step 518). The InteropTransmission builds an XML stream, using InteropParameters::mtdGetXML to get the XML representation of each in or in/out parameter (step 520). Interop Request returns the XML stream to the InteropTransmission class (step 522). The InteropTransmission class builds the entire stream and sends it to the external system via HTTPS (step 524). The InteropTransmission class receives XML response (step 526) and obtains the XML response for each request, assigning the XMLResponse property of each request accordingly (step 528). The InteropRequest object parses the XML Response, matching output parameters in the stream to the corresponding output parameters in the collection of parameters (step 530).

In an exemplary embodiment, for each such parameter: 1) the InteropRequest class sets the XML property of the parameter (step 532); 2) the InteropParameter class parses the XML stream to obtain the value returned, setting the Value property accordingly (step 534); 3) the InteropParameter class returns the result to the InteropRequest (step 536). The InteropRequest class then returns to the InteropTransmission class (step 538). The InteropTransmission class returns to the BPM (step 540) and the BPM examines the Parameters property of each InteropRequest to obtain the desired output values to return to the ASP page (step 542).

Figure 6:
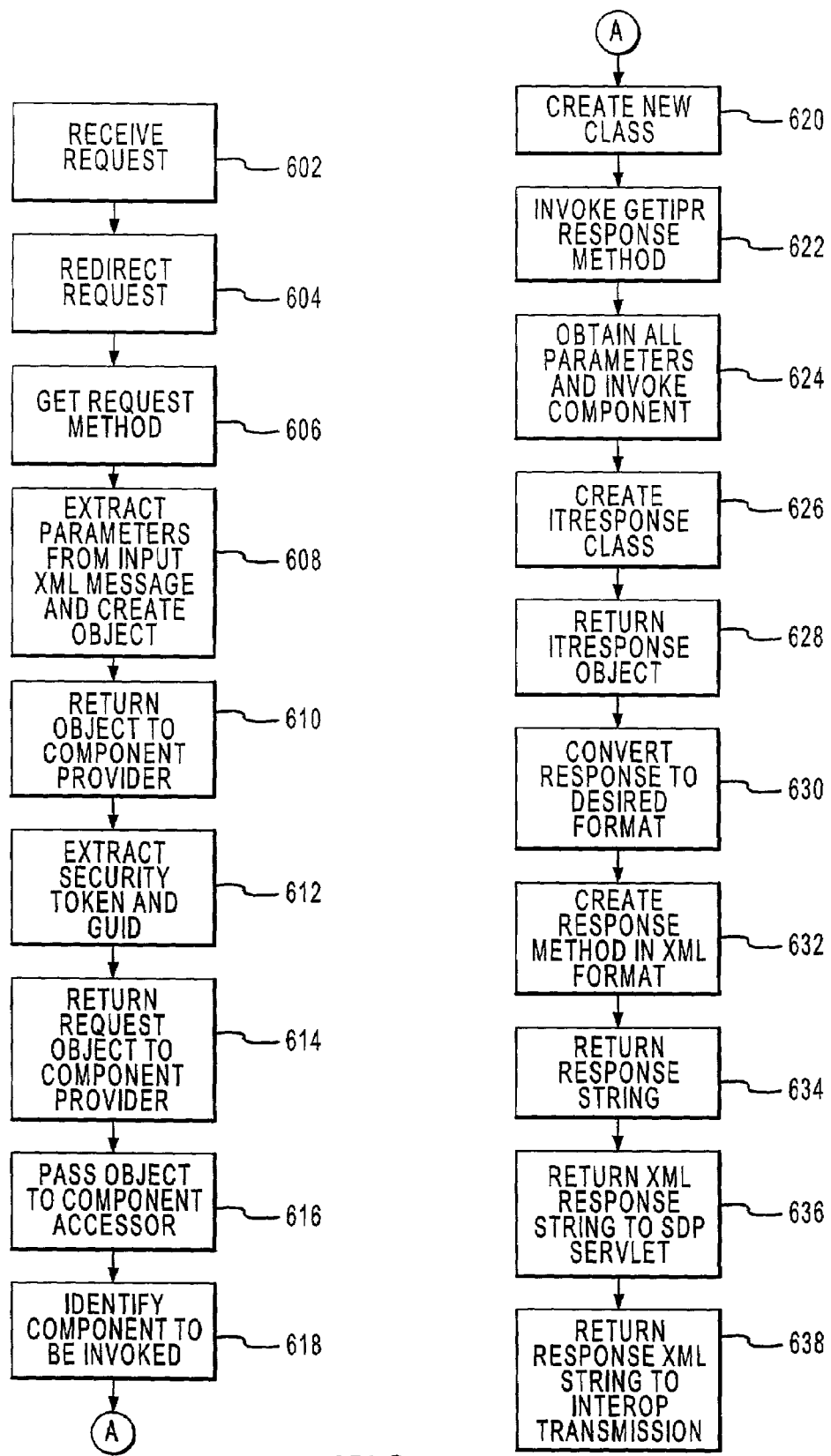
FIG. 6 is a flow chart illustrating an exemplary operation of an embodiment when SDP receives a request from an IT client.

With reference to FIG. 6, the operation of an embodiment of the present invention when SDP receives a request from an IT client will now be described. SDPServlet receives the request from InteropTransmission on SDP Server (step 602). SDPServlet redirects the request to Component Provider (step 604). Component Provider passes the request (in XML format) to SDPMessage class to get the request method (step 606). SDPMessage class invokes SDPXMLUtility to extract all the parameters from input XML message and creates an object SDPRequest that contains all input parameters (step 608). SDPMessage returns SDPRequest object to Component Provider (step 610). Component Provider then passes the SDPRequest object to SDPSecurity Class to extract Security token and a Global Unique Identifer ("GUID") from input Cookie String (step 612). GUID is a unique identifier that uniquely identifies the user. Each GUID can be logged to form a record as to the particular transactions performed by each user.

SDPSecurity class returns SDPRequest (which now contains the Security Token and GUID also) object to Component Provider (step 614). Component Provider passes SDPRequest object to ComponentAccessor Class (step 616). ComponentAccessor identifies the Component that needs to be invoked with the help of Parameter (step 618). ComponentAccessor class creates the instance of a ComponentHandler class for the Component to be invoked (step 620). ComponentAccessor invokes the getITR response method of ComponentHandler class, and passes the SDPRequest Object to it (step 622). ComponentHandler class obtains all the parameters required from SDPRequest object and invokes the component (step 624). ComponentHandler creates an ITResponse class based on the response received from the Component and returns it to ComponentAccessor (step 626). ComponentAccessor returns ITResponse object to ComponentProvider (step 628). ComponentProvider passes the ITResponse object to SDPMessage to convert the response to the required format (step 630). SDPMessage uses SDPXMLUtility to create Response Method in XML format (step 632). SDPMessage returns Response String to ComponentProvider (step 634). ComponentProvider returns the response XML String to SDPServlet (step 636). SDPServlet returns the response XML String to InteropTransmission on SDP Server (step 638).

Figure 8:
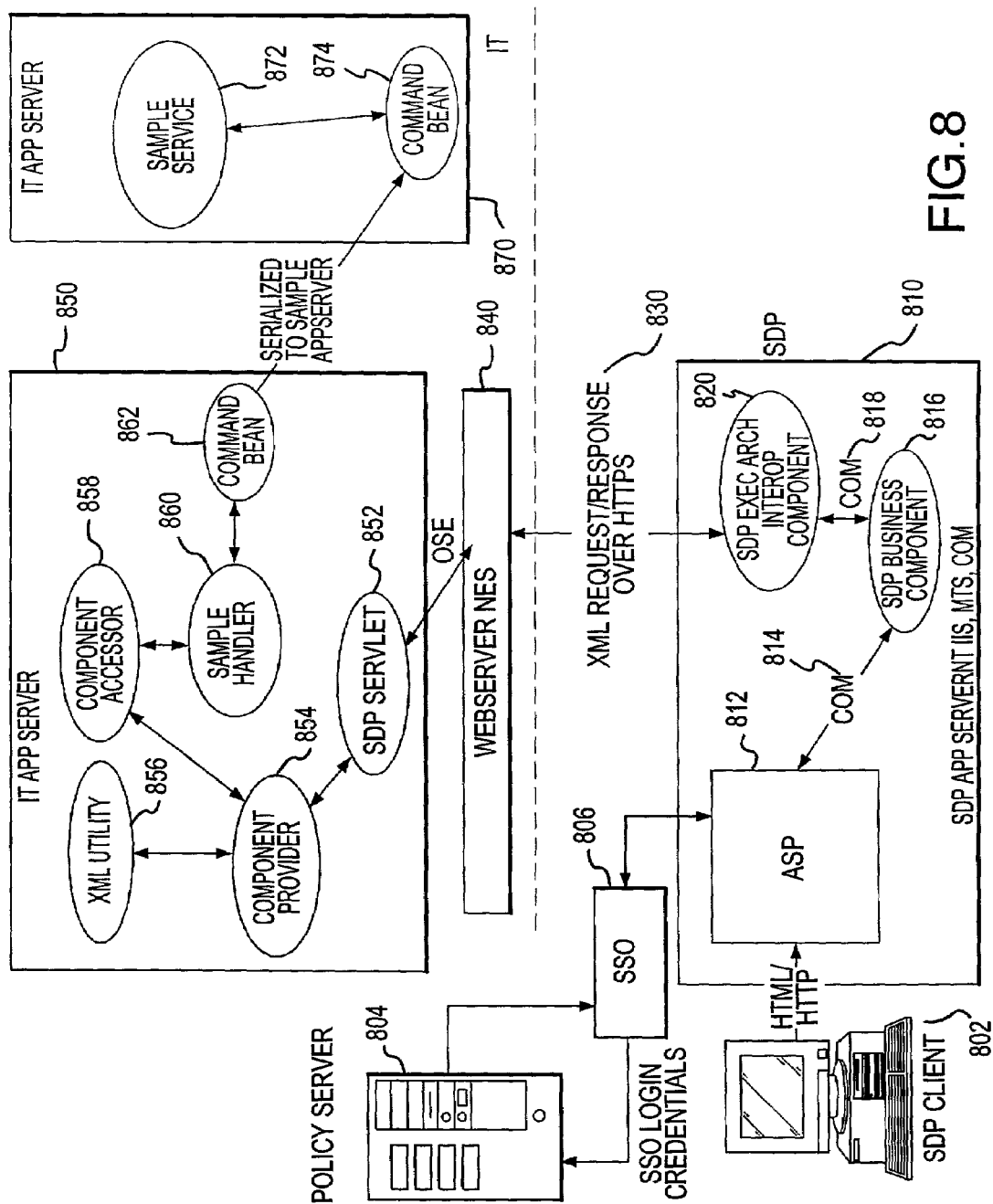
FIG. 8 is a flow chart illustrating an exemplary operation for facilitating communication between disparate computing platforms; and, FIG. 9 is a flow chart illustrating an exemplary overview of the operation of translating a request into a predetermined format.

FIG. 8 illustrates the operation of a system of an exemplary embodiment of the present invention. A client 802 accesses a COM server 810, possibly through the Internet, then client 802 accesses an Active Server Page ("ASP") 812. Such access may be controlled by SSO 806 and policy server 804. Via an internal COM link 814, client 802 has access to business component 816, which communicates via internal COM link 818 to an interoperability component 820, which formulates and transmits an XML request using HTTPS.

Web Server 840 receives the XML request thorough link 830, translates, and transmits the request to WAS server 850. Within WAS server 850 is a servlet 852, component provider 854, XML utility 856, and component accessor 858. Those components process the request and transmit the request to a handler 860. Handler 860 may perform many functions. For example, handler 860 may determine the balance summary of a requested account. However, it should be understood that such a handler can configured to process a variety of different functions. Handler 860 translates the request into a command bean 862, which interfaces, through link 864 with a command bean 874 located within another WAS server 870. Command bean 874 is configured to access sample service 872 and process the request of user 802. The result is then transmitted back through the above-described component to Web Server 840, where the result is transmitted via HTTPS as an XML stream. The XML stream is processed in COM server 810 and the result is eventually transmitted to client 802.

The above described process may be substantially seamless to client 802 such that client 802 has minimal knowledge or is unaware of the access to a different server. In such a manner, client 802 can access data located on WAS server 870 which was formerly unavailable or limited access due to the incompatible computing systems.

An exemplary XML record layout of an exemplary embodiment will now be presented. The following XML code represents an exemplary Document Type Definition ("DTD") used an embodiment of the present invention:

```
<!DOCTYPE ITINPUTDATA [
<!ELEMENT SysID (#PCDATA)>
<!ELEMENT DebugTrk (#PCDATA)>
<!ELEMENT PerfTrk (#PCDATA)>
<!ELEMENT ITUserID (#PCDATA)>
<!ELEMENT ITPswd (#PCDATA)>
<!ELEMENT SDPUserID (#PCDATA)>
<!ELEMENT Component (ComponentName, Method Type, (Parameter))>
<!ELEMENT ComponentName (#PCDATA)>
<!ELEMENT MethodType (#PCDATA)>
<!ELEMENT Parameter (#PCDATA)
]>
```

Utilizing the above DTD, the following XML code is a sample request for a balance summary in an exemplary embodiment where financial data is exchanged among different platforms:

```
<ITINPUTDATA>
    <SysID>IT</SysID>
    <DebugTrk>0</DebugTrk>
    <PerfTrk>0</PerfTrk>
    <ITUserID>EC9396B</ITUserID>
    <ITPswd>1234abcd</ITPswd>
    <Component>
        <ComponentNm>
            BalanceSummary
        </ComponentNm>
        <MethodType>
            BalanceSummaryPropertiesCommand
        </MethodType>
        <Parameter>
            34566742211232
        </Parameter>
    </Component>
</ITINPUTDATA>
```

An exemplary response XML stream (for a different request) is as follows:

```
<ITRESPONSE>
    <SysID>IT</SysID>
    <ITRespType>0</ITRespTyp>
    <ITResponseContent>
        <Data>
        <PropertyTable>
            <PropertyRec>
                <Property>
                    <PropNm>Type_platinum</PropNm>
                    <Prop Val>True</PropVal>
                <Property>
                <Property>
                    <PropNm>AccountStatus</PropNm>
                    <PropVal>ACTIVE</PropVal>
                <Property>
            </PropertyRec>
            <PropertyRec>
                <Property>
                    <PropNm>Type_platinum</PropNm>
                    <PropVal>True</PropVal>
                <Property>
                <Property>
                    <PropNm>AccountStatus</PropNm>
                    <PropVal>ACTIVE</PropVal>
                <Property>
            </PropertyRec>
        </PropertyTable>
        </Data>
    </ITResponseContent>
</ITRESPONSE>
```

The above-described approach has many benefits. For example, the use of a reliable, proven communication protocol eases the introduction of embodiments of the present invention. In addition, it is easy to implement, using ASP in SDP and JSP in IT. Furthermore, no additional software is required for either platform and only a small amount of code on both sides, to handle the requests/responses, is needed.

The interoperability framework has numerous other benefits including, for example, reduced future application development cost, reduced future application maintenance cost, reduced investment in duplicate technology and software, effective utilization of available infrastructure, reduced cost of development and operations, improved speed of development, leveraging existing cross application/cross platform resources, and improved inter-group communication and awareness. The invention also enables standard information to be provided to customers irrespective of computer platform and efficient communication across business/technology groups.

We claim:

1. A real-time method executed on a computer for exchanging information between disparate computing platforms, said method comprising:
   creating a first plurality of request messages on a first computing platform for information located on a second computing platform;
   formatting said first plurality of request messages to construct a request data stream;
   translating said request data stream at said first computing platform into a platform independent language to create a translated request data stream;
   transmitting said translated request data stream to said second computing platform;
   translating said translated request data stream at said second computing platform into a format readable by said second computing platform;
   parsing said translated request data stream into a second plurality of request messages;
   processing said second plurality of request messages at said second computing platform to create a plurality of first response messages;
   formatting said plurality of first response messages to construct a response data stream;
   translating said response data stream into said platform independent language; and,
   transmitting said response data stream to said first computing platform in said platform independent language.

2. The method of claim 1 wherein the platform independent language is a formatting mark-up language.

3. The method of claim 1, further comprising:
   translating said response data stream from said platform independent language to a format readable on said first computing platform;
   parsing said first response data stream into a second plurality of response messages; and,
   processing said second plurality of response messages on said first computing platform.

4. The method of claim 1, wherein said transmitting step uses an Hypertext Transfer Protocol (HTTP).

5. The method of claim 4 wherein said HTTP transmission is secure.

6. The method of claim 1, wherein said request data stream includes authentication information for access to information on said second computing platform.

7. The method of claim 6 wherein said authentication information comprises a user identification and a password.

8. The method of claim 1, wherein said request data stream includes information for locating requested information on said computing second platform.

9. A computer system executing computer functions for sharing data comprising:
   a first computing platform;
   a second computing platform configured to interface with said first computing platform;
   an interoperability component coupled to both said first computing platform and said second computing platform, said interoperability component configured to:
   format a first plurality of request messages to construct a request data stream;
   translate said request data stream at said first computing platform into a platform independent language to create a translated request data stream;
   transmit said translated request data stream to said second computing platform;
   translate said translated request data stream at said second computing platform into a format readable by said second computing platform;
   parse said translated request data stream into a second plurality of request messages;
   process said second plurality of request messages at said second computing platform to create a plurality of first response messages;
   format said plurality of first response messages to construct a response data stream; translate said response data stream into said platform independent language; and,
   transmit said response data stream to said first computing platform in said platform independent language.

10. The system of claim 9, wherein said interoperability component is further configured to translate said translated request data stream to a mark-up language format.

* * * * *